March 28, 1961 W. D. EDWARDS ET AL 2,977,146
PNEUMATIC SHOCK ABSORBER BUMPER FOR MOTOR VEHICLES
Filed July 23, 1956 2 Sheets-Sheet 1

INVENTOR
WILLIAM D. EDWARDS
& BURTON H. JOHNSON
BY
Lamont Johnston
ATTORNEY

March 28, 1961     W. D. EDWARDS ET AL     2,977,146
PNEUMATIC SHOCK ABSORBER BUMPER FOR MOTOR VEHICLES
Filed July 23, 1956     2 Sheets-Sheet 2
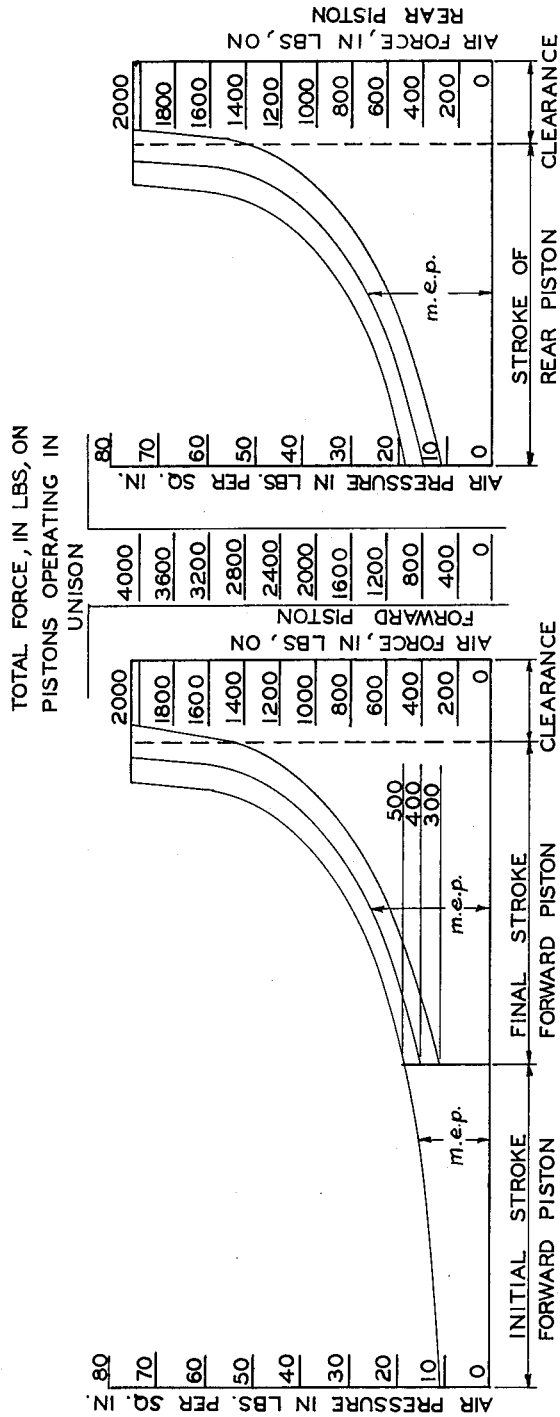
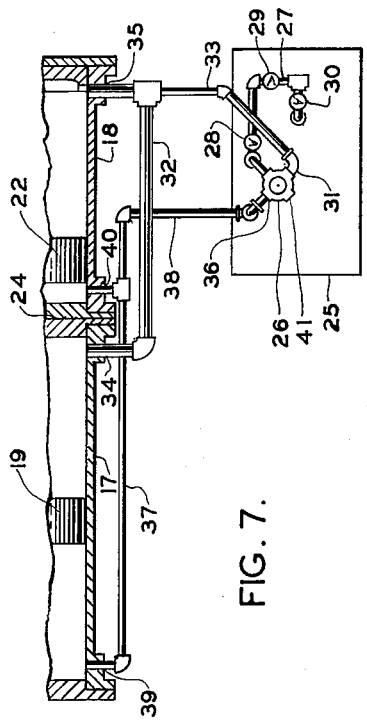
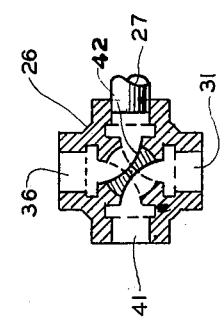
INVENTOR
WILLIAM D. EDWARDS
& BURTON H. JOHNSON
BY
*Lamont Johnston*
ATTORNEY

United States Patent Office 2,977,146
Patented Mar. 28, 1961

2,977,146

PNEUMATIC SHOCK ABSORBER BUMPER FOR MOTOR VEHICLES

William D. Edwards, 2630 Shelby Drive, Whitehaven, Tenn., and Burton H. Johnson, Westview Land Co., P.O. Box 135, Memphis, Tenn.

Filed July 23, 1956, Ser. No. 599,476

3 Claims. (Cl. 293—60)

This invention relates to a bumper and more particularly to a bumper combined with a shock absorbing system.

One object of this invention is to provide a bumper having a series of shock absorbers.

Another object of this invention is to provide a pair of pneumatic shock absorbers in series, one of said shock absorbers being adapted to reinforce the other.

A further object of this invention is to provide a bumper having extensible shafts, said shafts being capable of being extended or retracted by means of a series of pneumatic shock absorbers.

Another object of this invention is to provide a bumper comprising shock absorbers which will sustain an impact upon any portion of the bumper bar.

A further object of this invention is to provide a bumper combined with a pneumatic shock absorbing system, in which the bumper bar may be extended or withdrawn, in the absence of impact.

Further objects and advantages of the invention will be apparent from the following description taken in conjunction with the drawings, wherein:

Fig. 6 is a sectional view disclosing the operation of the four-way valve;

Fig. 7 is an enlarged fragmentary sectional view of the fluid pressure control system;

Fig. 8 is a pressure-volume diagram disclosing the various stages of compression for the forward piston; and Fig. 9 is a pressure-volume diagram disclosing the various stages of compression for the rear piston.

Figure 1:
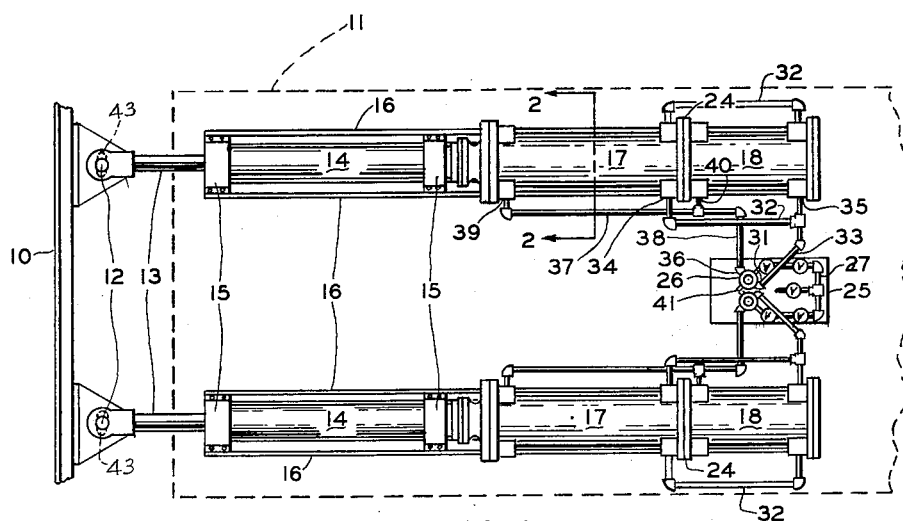
Fig. 1 is a top plan view of the invention mounted upon a motor vehicle chassis in phantom.

Referring now to Fig. 1 in more detail, the bumper assembly comprises a bumper bar 10 mounted transverse to the chassis 11 of a motor vehicle. The bumper bar 10 is loosely pivoted by pins 12 to shafts 13. The shafts 13 are adapted to slide in the direction parallel to the long axis of the chassis 11 within shaft housings 14 which are supported by bearings 15 mounted on the angle irons 16.

Coupled to the rear end of each housing 14 is a pair of pneumatic cylinders 17 and 18 in series. Adapted to reciprocate within the forward cylinder 17 is a piston 19 mounted on the rear end of tubing-shaft which extends through the forward end of the cylinder 17 and into the housing 14. The forward end of the tubing shaft 20 is coupled to the rear end of the shaft 13 by means of a coupling pin 21. Through these mechanical linkages, the piston 19 is adapted to be displaced the same distance as the bumper bar 10.

Adapted to reciprocate within the rear cylinder 18 is a piston 22. The piston 22 is mounted on the rear end of a shaft 23 which slidably extends through the mutual cylinder wall 24, through the piston 19, and within the tubing-shaft 20, the front end of the shaft 23 terminating within the housing 14. Thus, the piston shaft 23 is telescoped within the tubing-shaft 20. The length of the shaft 23 is such that when the piston 22 is in the forward portion of the cylinder 18, the front end of the shaft 23 will be contacted by the rear end of the shaft 13 when the bumper bar has been thrust to a position intermediate between its extended and retracted position, as disclosed in Fig. 4. The effect of this construction is that the final stroke of the forward piston 19 will cause the rear piston 22 to move in unison toward the rear of the cylinder 18, as disclosed in Figs. 4 and 5.

For controlling the pressure within the cylinders 17 and 18, a fluid reservoir 25 is provided, as disclosed in Figs. 1 and 7, containing a compressible fluid such as air. From the reservoir 25, compressed air is fed to the four-way valve 26 through conduit 27, provided with a check valve 28, an emergency cut-off valve 29 and a pressure reducing valve 30. Four-way valve inlet 31 communicates with one of the pressure equalizing conduits 32 through the conduit 33. The conduits 32 connect the compression spaces in the rear of cylinders 17 and 18 through ports 34 and 35, respectively. The purpose of the conduits 32 is to continually equalize the pressure in the cylinder compression spaces behind pistons 19 and 22 regardless of the piston positions. In a like manner, four-way valve inlet 36 communicates with pressure equalizing conduits 37 through conduit 38. The conduit 37 connects the cylinder spaces in front of the pistons 19 and 22 through ports 39 and 40, respectively. Port 41 in the four-way valve 26 acts as an exhaust.

Fig. 6 discloses the operation of the four-way valve 26. The solid line position of the vane 42 permits compressed air to flow from the reservoir 25 through the feed conduit 27, inlet 36, conduit 38, conduit 37 and through ports 39 and 40 into the cylinder spaces in front of the pistons 19 and 22, respectively. When the vane 42 is rotated through 90° to the dotted line position of Fig. 6, the air from reservoir 25 flows through conduit 27, inlet 31, conduit 33, conduit 32, and through ports 34 and 35 into the cylinder spaces behind the pistons 19 and 22, respectively.

The fluid reservoir 25 may be equipped with a small motor-driven fluid compressor, operated from a pressure control switch set at a predetermined pressure to be maintained in the reservoir. The fluid reservoir 25 might also be supplied with compressed fluid from the compressed air section of a service station through an auxiliary supply line.

Figure 3:
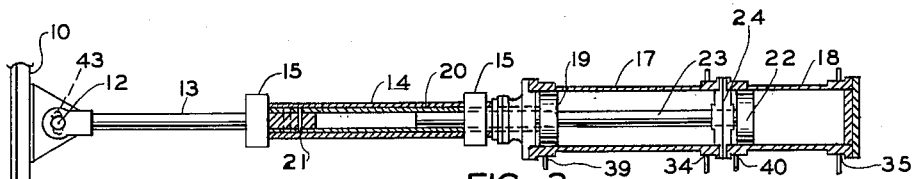
Fig. 3 is a top plan view, partly in section of the bumper bar in extended position.

The operation of the machine is as follows:

The normal position of the bumper assembly according to this invention is best disclosed in Figs. 1 and 3, in which the bumper bar 10 is extended from the chassis 11 and both pistons 19 and 22 are in their forward-most positions in their respective cylinders 17 and 18. The vane 42 of the four-way valve 26 is turned to the dotted line position in Fig. 6, to provide communication between the cylinder spaces behind the pistons 19 and 22, respectively, with the fluid reservoir 25.

Figure 4:
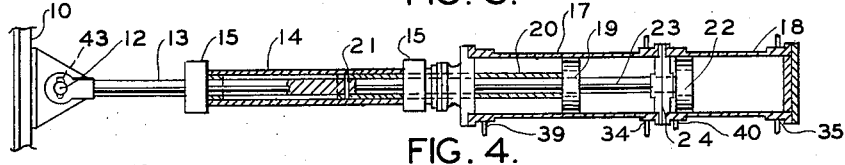
Fig. 4 is a top plan view similar to Fig. 3 disclosing the bumper bar in an intermediate position.
Figure 5:
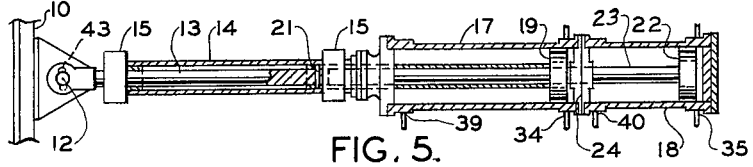
Fig. 5 is a top plan view similar to Fig. 3 in which the bumper bar is fully retracted.
Figure 2:
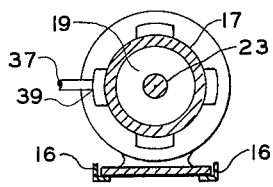
Fig. 2 is a section taken along the lines 2—2 of Fig. 1.

When the bumper bar 10 contacts any obstacle with sufficient force, the bumper bar 10 is thrust towards the chassis 11, causing the forward piston 19 to be displaced toward the rear of the cylinder 17 by a distance equal to the displacement of the bumper bar 10, through the shaft 13 and the tubing-shaft 20. When the bumper bar 10 and the forward piston 19 assume an intermediate position, as illustrated in Fig. 4, the rear end of the shaft 13 will contact the forward end of shaft 23. Continued rearward motion of the bumper bar 10 and shaft 13 will cause the shaft 23 and the rear piston 22 to move toward the rear of the cylinder 18 at the same velocity as the bumper bar 10 and the forward piston 19. The initial stroke of the forward piston 19 will compress the air in the rear portion of the cylinder 17, the increased pressure being equally distributed to the rear portion of cylinder 18 through the conduit 32.

As the pressure in the rear of cylinders 17 and 18 increases during the initial stroke of piston 19, resistance to movement of the bumper bar 10 also increases. Moreover, during the final stroke of piston 19, when it is reinforced by the stroke of the piston 22, the resistance to movement of the bumper bar 10 is proportionately increased.

The resistance in pounds of force developed by the action of the pistons 19 and 22 in their respective cylinders 17 and 18 is disclosed in the pressure-volume diagrams of Figs. 8 and 9, for different mean effective pressures (M.E.P.) on the pistons. The diagrams illustrate the rapid increase of pressure toward the end of the stroke for each piston, and also show that the total force of both pistons acting in unison is double that of the action of a single piston, where the pistons 19 and 22 are the same size.

In the event the bumper bar 10 receives an impact which is off-center, the oval slots 43 are incorporated in the bumper bar 10 to slidably engage the pivot pins 12 and permit the bumper bar 10 to tilt at an angle to the front of the chassis 11. Since each shaft 13 and its cooperating shock absorbing unit is adapted to function independently of any other shaft and shock absorbing unit, the greatest proportion of an off-center impact will be transferred to the shaft 13 and cylinders 17 and 18 closest to the point of impact.

When it is desired that the bumper bar be retracted, for example, to facilitate parking the vehicle by reducing its overall length, controls may be operated to rotate the vane 42 of four-way valve 26 to its solid line position in Fig. 6. Thus, compressed air will be permitted to flow from reservoir 25 through conduit 27, valve 26, conduit 38, conduit 37 and ports 39 and 40 to force the pistons 19 and 22 to the rear of their respective cylinders 17 and 18, and cause the bumper bar 10 to assume the retracted position of Fig. 5. Operation of the controls to rotate the vane 42 through 90° to the dotted line position of Fig. 6 will cause compressed air from reservoir 25 to enter the ports 34 and 35, forcing the pistons 19 and 22 forward and extending the bumper bar again to its normal position in Fig. 3.

Although the invention has been described as a bumper for a motor vehicle, it may be readily adapted for use as a front, rear, or side bumper on any type vehicle such as a trailer, marine craft, railroad locomotive, or railroad car. The invention may also be adapted for use as landing gear for helicopters and bumpers on parachute drops.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. In a bumper assembly, a bumper bar, a first shaft including a solid section attached to said bumper bar and a hollow tubing section, a shaft housing in which said shaft is slidable in an axial direction, first and second pneumatic cylinders mounted end to end coaxially with said first shaft, said first cylinder being appreciably longer than said second cylinder, said cylinders having a common wall with an opening therethrough coaxial with said first shaft, a first piston within said first cylinder attached to the end of the hollow tubing section of said first shaft, said piston having an opening therethrough coaxial with said first shaft, a second shaft telescoped within the hollow tubing section of said first shaft and slidable through the openings in said first piston and in the common wall of said first and second cylinders, and a second piston within said second cylinder attached to the rear end of said second shaft, the front end of said second shaft being spaced from the solid section of the first shaft when both shafts are in their forwardly extended positions a distance equal to approximately the difference between the total lengths of travel of the first and second pistons, said second shaft being engaged after a movement of said first shaft from its extended position through said spacing distance toward said second cylinder by the solid section of said first shaft to move said second piston.

2. In a bumper assembly, a bumper bar, a first shaft including a solid section attached to said bumper bar and a hollow tubing section, a shaft housing in which said shaft is slidable in an axial direction, first and second pneumatic cylinders mounted end to end coaxially with said first shaft, said first cylinder being appreciably longer than said second cylinder, said cylinders having a common wall with an opening therethrough coaxial with said first shaft, a first piston within said first cylinder attached to the end of the hollow tubing section of said first shaft, said piston having an opening therethrough coaxial with said first shaft, a second shaft telescoped within the hollow tubing section of said first shaft and slidable through the openings in said first piston and in the common wall of said first and second cylinders, a second piston within said second cylinder attached to the rear end of said second shaft, the front end of said second shaft being spaced from the solid section of the first shaft when both shafts are in their forwarding extended positions a distance equal to approximately the difference between the total lengths of travel of the first and second pistons, said second shaft being engaged after a movement of said first shaft from its extended position through said spacing distance toward said second cylinder by the solid section of said first shaft to move said second piston, a first air conduit connecting the spaces in each cylinder forward of the pistons, and a second air conduit connecting the spaces in each cylinder behind the pistons.

3. In a bumper assembly, a bumper bar, a first shaft including a solid section attached to said bumper bar and a hollow tubing section, a shaft housing in which said shaft is slidable in an axial direction, first and second pneumatic cylinders mounted end to end coaxially with said first shaft, said first cylinder being appreciably longer than said second cylinder, said cylinders having a common wall with an opening therethrough coaxial with said first shaft, a first piston within said first cylinder attached to the end of the hollow tubing section of said first shaft, said piston having an opening therethrough coaxial with said first shaft, a second shaft telescoped within the hollow tubing section of said first shaft and slidable through the openings in said first piston and in the common wall of said first and second cylinders, a second piston within said second cylinder attached to the rear end of said second shaft, the front end of said second shaft being spaced from the solid section of the first shaft when both shafts are in their forwardly extended positions a distance equal to approximately the difference between the total lengths of travel of the first and second pistons, said second shaft being engaged after a movement of said first shaft from its extended position through said spacing distance toward said second cylinder by the solid section of said first shaft to move said second piston, a first air conduit connecting the spaces in each cylinder forward of the pistons, a second air conduit connecting the spaces in each cylinder behind the pistons, and means for supplying compressed air alternately to said second air conduit prior to impact on said bumper or to said first air conduit.

References Cited in the file of this patent

UNITED STATES PATENTS

| | | |
|---|---|---|
| 847,941 | Hayward | Mar. 9, 1907 |
| 1,363,360 | Schwend | Dec. 28, 1920 |
| 1,373,822 | Kleine | Apr. 5, 1921 |
| 1,470,153 | Dicherson | Oct. 9, 1923 |
| 1,807,132 | Pappas et al. | May 26, 1931 |
| 1,824,855 | Whittaker | Sept. 29, 1931 |
| 1,925,461 | Ridge | Sept. 5, 1933 |
| 2,001,093 | Cherpes et al. | May 14, 1935 |
| 2,047,955 | Fitch | July 21, 1936 |
| 2,231,058 | Doran | Feb. 11, 1941 |
| 2,522,385 | Lindsay | Sept. 12, 1950 |
| 2,692,618 | Ludowici | Oct. 26, 1954 |

FOREIGN PATENTS

| | | |
|---|---|---|
| 487,835 | France | May 7, 1918 |
| 57,006 | Germany | June 11, 1891 |
| 912,536 | Germany | Mar. 31, 1954 |
| 424,703 | Great Britain | Feb. 27, 1935 |
| 457,299 | Great Britain | Nov. 25, 1936 |